United States Patent [19]

Parsons et al.

[11] Patent Number: 4,741,017

[45] Date of Patent: Apr. 26, 1988

[54] APPARATUS AND METHOD FOR IDENTIFYING AND ANALYZING TELEPHONE CHANNEL UNITS, COMMANDS AND RESPONSES

[75] Inventors: Gerald J. Parsons, West Chester; Leo D. Parsons, Chester Springs; David Broderick, Frazer; Ronald M. Zerby, Downingtown, all of Pa.

[73] Assignee: Communications Test Design, Inc., Chester, Pa.

[21] Appl. No.: 939,367

[22] Filed: Dec. 8, 1986

[51] Int. Cl.⁴ .............................................. H04M 3/24
[52] U.S. Cl. .................................................... 379/32
[58] Field of Search ................... 379/5, 10, 11, 15, 16, 379/17, 32, 33

[56] References Cited

U.S. PATENT DOCUMENTS

| | | | |
|---|---|---|---|
| 3,908,099 | 9/1975 | Borbas et al. | 379/10 |
| 3,980,839 | 9/1976 | Hutcheson | 379/15 |
| 4,412,282 | 10/1983 | Holden | 379/32 |
| 4,538,138 | 8/1985 | Harvey et al. | 379/33 |
| 4,594,480 | 6/1986 | Betton | 379/10 |
| 4,633,039 | 12/1986 | Holden | 379/32 |

FOREIGN PATENT DOCUMENTS 3212236 3/1982 Denmark ............................ 379/10
3235882 9/1982 Denmark ............................ 379/15

OTHER PUBLICATIONS

Morris et al., 'Cairo: Computer Analysis of Incident Recorder Output for TXK4', The Post Office Electrical Engineers Journal, 'London', vol. 74, Jul. 81, pp. 86-91.

Primary Examiner—Stafford D. Schreyer
Attorney, Agent, or Firm—Connolly and Hutz

[57] ABSTRACT

A plurality of control channel units in a telephone channel bank which communicate with other control channel units through a trunk line connection are serviced by a system which monitors data transmission consisting of coded commands and responses. These commands are transmitted to and response received from the channel units. A central control which provides the commands in coded characters which in the described embodiment are hexadecimal numbers. The monitoring system receives the data of the coded characters and analyzes and stores the data in memory. The data stored is thus analyzed for abnormal or erroneous conditions or status. When such condition or status or other failure occurs it is detected, the circumstances of the occurrence are reviewed and reported in a print-out on a printer. And also the report may be displayed on a screen. Thus, the report of the failure is accompanied by an evaluation of the failing channel.

4 Claims, 5 Drawing Sheets

APPARATUS AND METHOD FOR IDENTIFYING AND ANALYZING TELEPHONE CHANNEL UNITS, COMMANDS AND RESPONSES

BACKGROUND OF THE INVENTION

The present invention relates to an apparatus and method for identifying, evaluating, reporting and otherwise servicing abnormal and erroneous status of in the condition and operation of control channel units in telephone stations.

In telephone communication systems a central control through a peripheral unit control sends commands to station control channel units and gathers data on the status and condition of these channel units. Particularly, this data contains information on a number of conditions or activities such as babbling, chattering relays, wrong status of the channel, and false loop status. This data on the channel unit status and condition is stored in the central control.

SUMMARY OF THE INVENTION

In view of the foregoing, an object of this invention is to undertake immediate evaluation of the data transmitted to and from the channel units. A further object is the detection and identification of abnormal or erroneous conditions in the channels.

In accordance with this and other objects of the invention there is provided a method and means for servicing telephone control channel units by contemporaneous evaluation by detecting, identifying and reporting on status and conditions of individual channel units from data obtained from the channels.

In this invention information on the conditions in the telephone channel units is monitored, analyzed, and reported. A telephone channel unit is part of a system providing automatically, telephonic communication. Conditions within a bank of such channel units are sensed and identified by coded electronic signals transmitted from a peripheral unit control part of a telephone system central control, to channel units typically in a channel bank.

The information on the condition of channel units in the data present in the transmitted signals is inputted to the computer mechanism of the analyzer of this invention, stored in a temporary memory during processing and analyzed and outputted to a display monitor and/or a printer. A central processing unit coordinates the movement of the information and does the actual analyzing of the reported conditions of the channel units. The central processing unit is designed to recognize electronic codes that tell it to perform specific functions in the analysis.

A program stored in a read-only memory, ROM, provides instructions which the central processing unit executes in copying the data into the temporary memory and control the analyzer in the analysis and reporting of the commands and responses. Thus the program in the ROM provide the instruction for communicating with the input of the monitored data from serial in and serial out lines between the peripheral control unit and the channels. Also instructions are provided for communicating with the output devices, the display screen of the monitor and the printer.

A keyboard also puts into the central processing unit instructions on the operation and analysis and reporting.

In this processing the analyzer reviews the data monitored from the channel units and compares it with data stored in the temporary memory. The analysis includes detection of such errant conditions in telephonic operation as failures, abnormal call sequences, the time frame of the signals, babbling, chattering relays and wrong status of signals.

The access to the data stored in the temporary memory for analysis in comparison with the monitored data and the resultant determinations makes it possible to detect, analyze and report errant conditions as they occur.

DETAILED DESCRIPTION OF THE PREFERRED EMBODIMENTS

Figure 1:
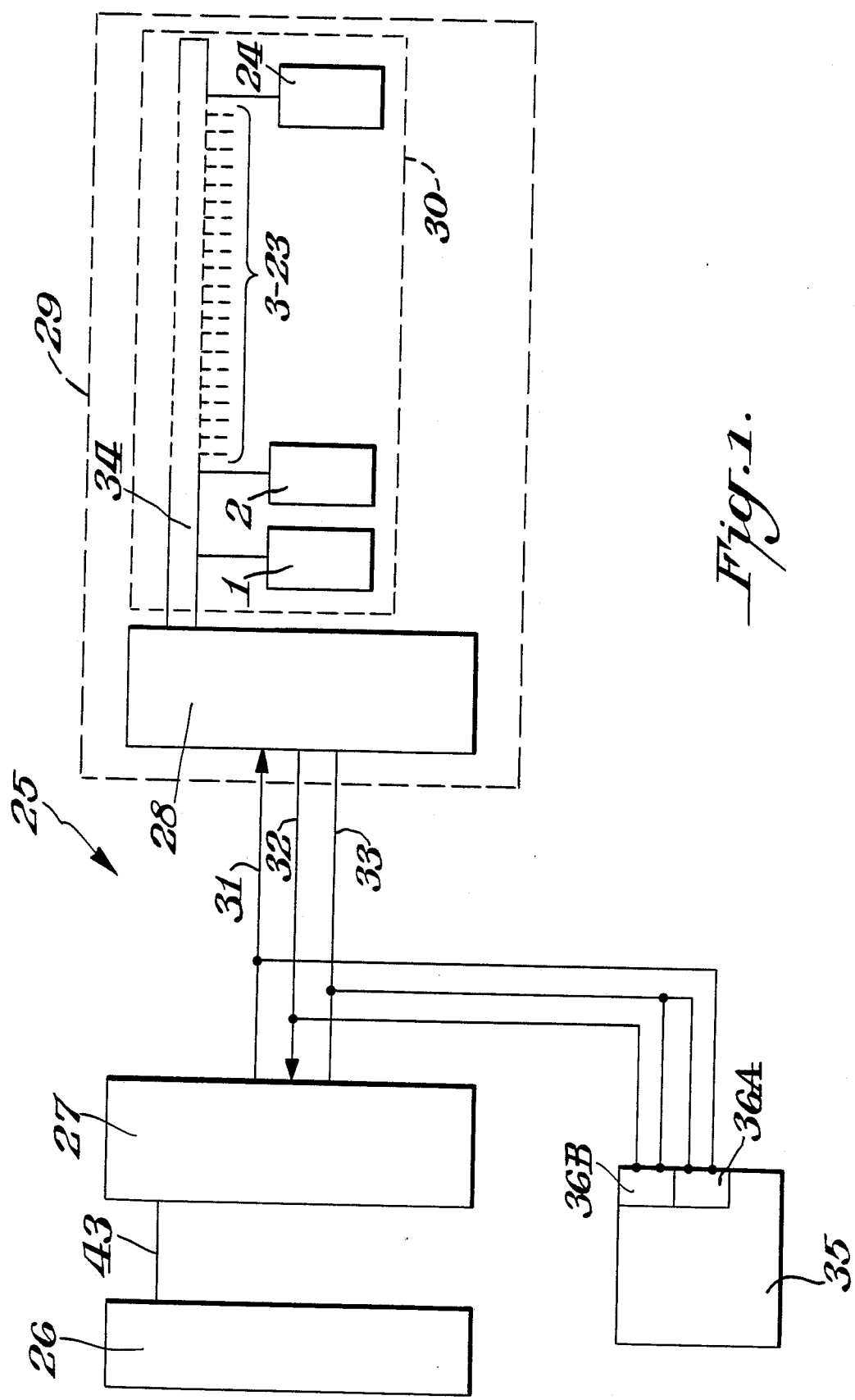
FIG. 1 is a block diagram of a system embodying the present invention.

FIG. 1 shows a representative telephonic communication system 25 illustrating the principles of the invention. The system 25 includes a central control 26 which provides a program controlling the operation of the peripheral unit control hereinafter referred to as PUC 27. The system 25 processes digital signals, which in this embodiment consists of hexadecimal numbers. The PUC 27 sends command data to an alarm/digroup control unit 28, hereinafter referred to as A/DCU 28 at a channel bank 29. On decoding the commands the A/DCU 28 sends instructions to a selected channel unit in a section identified herein as channel section 30. Three representative channel units 1, 2 and 24 are shown in FIG. 1. Typically a channel section 30 will contain twenty-four channel units. The command from the PUC 27 to the A/DCU 28 is transmitted over a serial in, or write line 31. Conversely, data on the status of an instructed channel unit is transmitted in a response to the PUC 27 from the A/DCU 28 on the serial out or read line 32. Thus the respective channels 1–24 are instructed to execute tasks by commands and the status of the instructed channel units 1–24 is reported to the PUC 27 in responses. These commands and responses are in coded characters and comprise the data transmission which is monitored by the analyzer.

The timing of the operation, as for example transmission of the commands, is provided by clock pulses generated in the PUC 27 and transmitted to the A/DCU 28 over the clock line 33 referred to in further detail below. The control of the PUC 27 from the central control 26 is transmitted over a line 43.

An analyzer 35 is tapped onto the serial in line 31 and serial out line 32 so that the analyzer 35 receives and monitors the commands and responses of the data transmission. The timing provided by the clock line 33 is also received at the analyzer 35.

Figure 2:
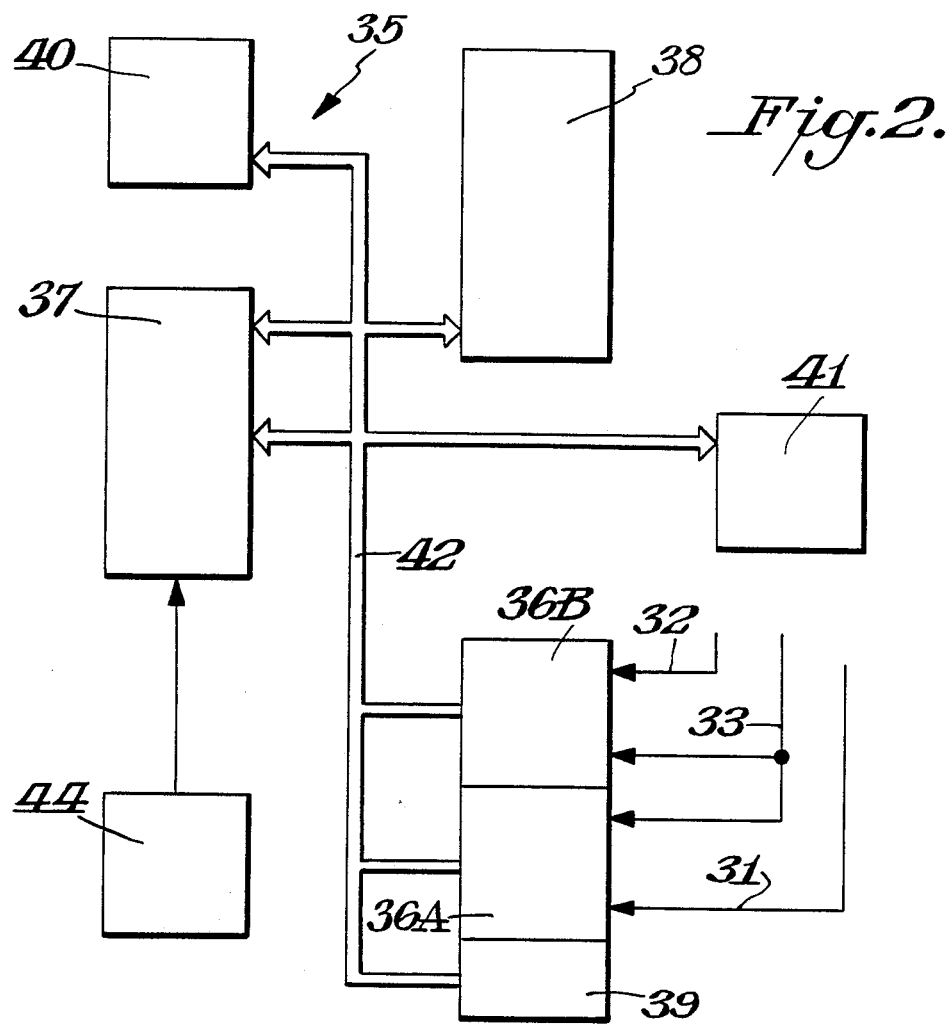
FIG. 2 shows the block diagram of an analyzer display and printer according to the present invention.

The analyzer 35 is illustrated in FIG. 2 and contains an input link provide by universal asynchronous receiver transmitters hereinafter referred to a UART 36A and UART 36B, a central processing unit 37 hereinafter referred to as CPU 37, a temporary memory 38, a printer 39 and a programmable EPROM 40. Also a display screen monitor 41 is connected to display the data. A bus 42 interconnects the components of the analyzer 35.

The CPU (central processing unit) 37 performs the calculations and logical operations and other data manipulations. The CPU 37 receives instructions, such as power on from a keyboard 44. The CPU 37 in the evaluation of the data transmission operates under program control of the EPROM 40. The CPU 37 is connected to the memory of an EPROM 40 via a bus 42. This program in the EPROM 40 is available to the CPU 37.

The analyzer 35 receives the data of the commands sent to the channel bank 29 on serial in line 31 at the UART 36A. The data of the responses from the channel bank 29 are received on the serial line 32 at UART 36B. The analyzer 35 stores this data in the memory 38 and then under the program recalls the data in the CPU 37 to analyze the data to detect errors and abnormalities as in a call sequence.

The data transmission between the PUC 27 and the A/DCU 28 of the channel bank 29 is in the command codes. This coded data is suitable for transmission in the system 25, as explained further below. In the preferred embodiment described herein the coded characters are hexadecimal numbers.

Connected to the serial in line 31 and serial out line 32 which carry the transmission to and from channel bank 29, the analyzer 35 monitors all 24 channel units of the channel 29. The analyzer gathers the serial in the serial out data being transferred between the PUC 27 and the A/DCU 28. The data from the channel units is stored in memory 38 and this stored data is available for analysis and display.

The CPU 37 analyzes the data under the control of a program written in the EPROM 40. This analyzer program seeks errors and abnormalities in selected conditions in the channel units 1-24 and on detection identifies the error, abnormality etc. and upon identification isolates and recreates the sequence of steps of the data transmission in a predetermined time period immediately preceding the error, abnormality, etc.

Under the control of the programmed digital signals from the EPROM 40, the CPU 37 processes the monitored data transmission. The data in the form of the coded characters is stored in addresses in the memory 38 by the CPU 37 for evaluation by the analyzer program.

Figure 3:
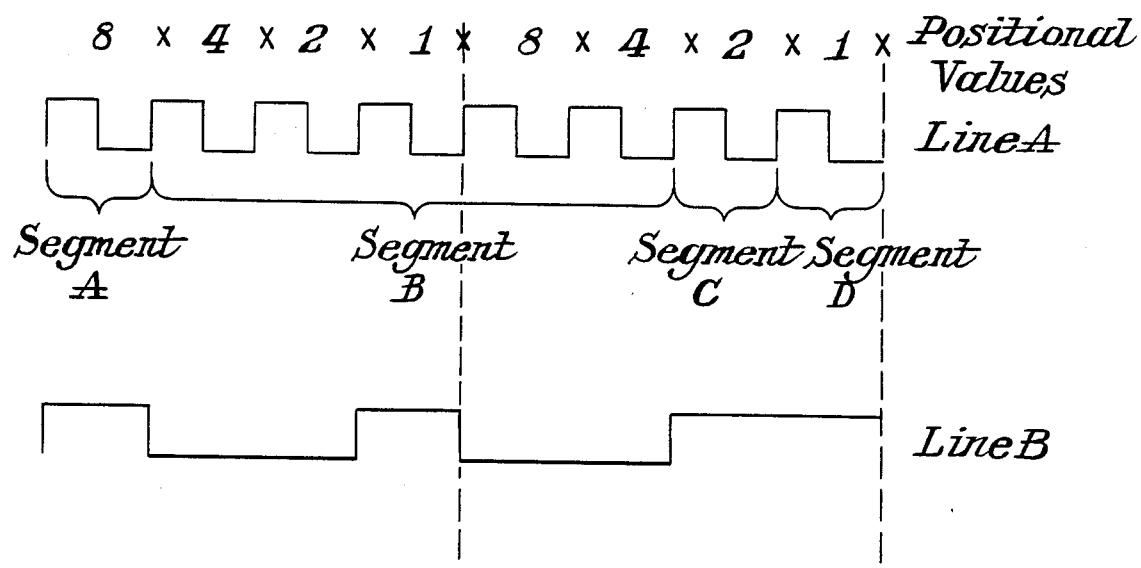
FIG. 3 is a chart illustrating the timing of bits which form hexadecimal numbers.

FIG. 3 is a chart illustrating the clock pulses on clock line 33 which provide the timing of the hexadecimal numbers of the data transmission. FIG. 3 shows on line A the series of evenly spaced pulses generated on the clock line 33. It will be understood that the switching activity providing the hexadecimals in the system 25 is in keeping with pulses such as represented in FIG. 3. In addition to the clock pulses of line 33 as represented in FIG. 3 the CPU 37 contains a clock which independently generates the clock pulses for the switching activity within the CPU 37.

In FIG. 3 line A shows two time periods in the clock pulses consisting of four pulses for each time period. Thus each of the two periods provides for the switching for four bits. These four bits make up the sixteen possible digits of the hexadecimal numbers so that each time period represents a hexadecimal number. Line B of FIG. 3 illustrates a representative change of states such as occurs on the serial in line 31 or serial out line 32 to transmit a command or response. The coded data illustrated is the hexadecimal number HEX 93. Hexadecimal 9 is charted in the left most time period and hexadecimal 3 is charted to the right.

FIG. 3 illustrates the combination of eight bits in the two time periods to provide separate segments of the consecutive pulses, in which segments, the programming of the data transmission uses the bits for designated hexadecimals.

Viewing the chart of FIG. 3 from left to right the leftmost brace embraces the leftmost bit and identifies an information segments A, next to the right is a brace embracing the next five bits and identifies an information segment B. Next to the right are two more segments C and D similarly identified.

FIG. 3 shows the binary-to-decimal value of the bit it is seen that binary-to-decimal data transmitted in the various segments A, B, C and D is demonstrated in FIG. 3. In the operation of the present embodiment the five bits of the second segment B identify the channel unit involved in a data transmission by a hexadecimal number.

The data transmission includes data sent from the bank 29 to the PUC 27 on the serial out line 32. This is requested information from the central control 26 and includes information of changes that may have occurred from the far end or near end in communication between channel banks. Also the transmitted information of the data transmission can establish whether commands have been in the serial in line 31. The following formats are representative of the transmission of serial out data. In HEX 07, 13, the 07 means that TA/TB status information is being transmitted in a subsequent signal and HEX 13 identifies channel 1 and reports status information, which is TA=1, TB=1. Further updates or changes when occurring within the channels 1-24 may be reported as for example HEX 93 on the serial out line 32 means channel 1, RA=1, RB=1 and indicates a change recently occurred at the far end. Similarly, HEX code 10 on the serial out line 32 means channel 1 and K1 and K2 were recently changed to the off state.

FIG. 2 shows a simplified block diagram of the analyzer 35. In a embodiment of the present analyzer, the UARTS 36A and 36B use 6526 and 6522 and SY6551 units. The CPU 37 uses 555 units as a clock and 74LS244 and 74LS245 units. The memory 38 uses 6264 LP15's. The EPROM 40 uses 2532 units.

Definitions

UARTS: UART is a acronym for Universal Ansynchronous Receiver Tramsmitter. it is a module (IC) that supports a frame protocol to send up to eight (8) bit characters. The 6551 is one such device intended to provide for interfacing 6500/6800 Microprocessor families to serial communication data sets and modems.

6522: The SY6522 Versatile Interface Adapter is a highly flexible component used in conjunction with a 6502 microprocessor to handle peripheral interfaces.

74LS244: Octal buffers; line drivers; line receivers.

6264LP-15: This is an 8192-word×8-bit high speed static CMOS RAM IC.

6526: The 6526 Complex Interface Adapter (CIA) is a 6502 bus compatible peripheral device with extremely flexible timing and I/O capabilities. This IC is used in the DCT Bank Analyzer for real time clock purposes.

74LS245: Octal BUS transceivers.

The detection of conditions and changes of conditions in the channels and identification of these conditions and changes for reporting and servicing is illustrated by reference to the following examples and monitored data transmission which is read-in and stored in the analyzer 35 and evaluated to detect conditions and changes, such as errors or abnormal call sequences.

These are examples of logic sequences in the data analyzation executed by the analyzer and are set forth below under the headings Transmission Steps A and B and including analyzation of echo, relay status, babbling or chattering relays.

The following steps are illustrative of transmitted signals which are evaluated. In the following descriptions it will be understood that the coded characters are in hexadecimal numbers.

In these representations of data transmission the symbols TA and TB identify in the functioning of the channel units, transmit signaling, while the symbols RA and RB identify receive signaling. K1 and K2 represent relays and the status of the relays, off or on.

TRANSMISSION STEPS A

A. When a serial in command changes a relay state of a channel, an echo should come back over the serial out lead if relays were previously in a different state. Conversely, an echo should not come back if relays were previously in the same state.

Examples

| 1. Relay Change Command | | |
|---|---|---|
| Serial In | Serial Out | |
| 12 | | Channel 1, K1=ON, K2=OFF |
| | 12 | Channel 1 echoes back a command since a change occurred. |
| 2. No Relay Change | | |
| Serial In | Serial Out | |
| 12 | | Channel 1, K1=ON, K2=OFF |
| | No Echo (Blank) | No echo occurs since the state of relays did not change |

B. When a request of relay register command 06 is sent on serial in line 31, the response from serial out line 32 must match the previous relay status as controlled by serial in

| 1. Relay STatus Request | | |
|---|---|---|
| Serial In | Serial Out | |
| 90 | | TA=O, TB=O Selects Channel 1 |
| 06 | | Requests relay status. |
| | 06 | Relay status to follow. |
| | 12 | Channel 1, K1=ON, K2=OFF |

C. Babbling or chattering relays will constantly send false relay information to the PUC 27 over the serial out line 32.

Babbling "10-10-10-10"

Examples

| 1. Babbling Unit - Failure | | |
|---|---|---|
| Serial In | Serial Out | |
| Any Code | | |
| | 10 | This means Channel 1, K1=OFF, |
| | 10 | K2-OFF, but code should only |
| | 10 | appear once. Constantly sending |
| | 10 | 10 will fill the PUC with wrong |
| | 10 | data and then the PUC will shutdown the digroup. |
| 2. Chattering | | |
| Serial In | Serial Out | |
| 12 | | Channel 1, K1=ON, K2=OFF |
| | 12 | Echo is proper. |
| | 10 | K1=OFF, K2=OFF - K1 is chattering |
| | 10 | K1=ON, K2=OFF - K1 is chattering |
| | 10 | K1=OFF, K2=ON - K1 is chattering |

Next, referring to TA/TB conditions the following steps are illustrative of command transmission for evaluation by detection, identification, and reporting:

TRANSMISSION STEPS B

A. When a command to change TA/TB status is sent over the series in line 31, no echo is sent back to the PUC 27 over serial out line 32. When the TA/TB change does occur, a TA/TB status request will follow on the serial in line 31.

Example

| 1. TA/TB Change - Good | | |
|---|---|---|
| Serial In | Serial Out | |
| 93 | | Channel 1, TA=1, TB=1 |
| 07 | | Requests TA/TB status. |
| | 07 | TA/TB status to follow. |
| | 13 | Channel 1, TA=1, TB=1 |

B. When a request of TA/TB register is sent on serial in line 31, the response from serial out line 32 must match previous TA/TB status as controlled by serial in.

| 1. TA/TB Request - Failure | | |
|---|---|---|
| Serial In | Serial Out | |
| 03 | | Channel 1, TA=1, TB=1 |
| 07 | | Requests TA/TB status |
| | 07 | TA/TB status to follow. |
| | 10 | Channel 1, TA=O, TB=O This is a FAILURE since TA and TB should both be "1" from the last serial in code sent (93). |

Referring to RA/RB conditions the following steps are illustrative of transmission for detection, identification, evaluation and reporting:

The state of RA/RB is controlled by the far-end signaling on the RSAB lead which receives signaling bits from A and B frames. When a change occurs, the new RA/RB status will be seen on the serial out line 32.

| 1. RA/RB Change - Distant Office Causes Change | | |
|---|---|---|
| Serial In | Serial Out | |
| Any Code | | |
| | 93 | Channel 1, RA=1, RB=1 Notice no request code was sent on serial in. When the far |

| 1. RA/RB Change - Distant Office Causes Change |
| --- |
| end office signals over RA/RB, a change will immediately be sent to the PUC over the serial out lead. |

C. When a request 05 of the RA/RB register is sent on serial in line 31, the response from serial out line 32 must match the previous RA/RB status as controlled by the RSAB lead.

Examples

| 1. RA/RB Status Request - Good | | |
| --- | --- | --- |
| Serial In | Serial Out | |
|  | 93 | Far end signals RA=1, RB=1 |
| 10 |  | Channel 1, K1=OFF, K2=OFF |
| 05 |  | Request status of RA/RB |
|  | 05 | RA/RB status to follow. |
|  | 13 | RA=1, RB=1 for Channel 1. This is correct |

D. Babbling or chattering RA/RB will constantly send an RA/RB change of status on the serial out line 32

Examples

Babbling: 93-93-93-93
Chattering: 93-90-93-90

| 1. Babbling Unit - Failure | | |
| --- | --- | --- |
| Serial In | Serial Out | |
| Any Code |  | Channel 1, RA=1, RB=1 |
|  | 93 | Channel 1, RA=1, RB=1 |
|  | 93 | This update code should only appear once, otherwise the |
|  | 93 | PUC 27 will shut the A/DCU 28 down |
| 2. Chattering - Failure | | |
| Serial In | Serial Out | |
| Any Code |  |  |
|  | 93 | RA/RB is constantly changing |
|  | 90 | states. This can be a faulty |
|  | 93 | channel unit or a faulty T1 span. |
|  | 90 |  |

The analyzer 35 monitors by its connection with serial in line 31 and serial out line 32 which are connected to the A/DCU 28 and then with the channel units 1-24 of the respective channel bank 39. These channel unit 1-24 are the near end channel units in the above-illustrations. The far end channel units are the channel units the near end channel units are in communication with through the trunk line.

It will be understood that in the operation of the telephone equipment in which the channel units 1-24 are incorporated, these channel units 1-24 are in communication through a trunk line with similar channel units in another geographic area. A call sequence in the commands between the PUC 27 and the A/DCU 28 as monitored by analyzer 35 relates to such communication calls between a channel at the near end and a channel at the far end.

Table I illustrates as detected in the analyzer 35 typical call sequences or originating a call at the near end. The columns from left to right represent the coded characters from PUC to A/DCU 28, the coded characters from A/DCU 28 to PUC 27, description, the state, comments on the call and time where applicable.

For the purposes of this illustrative embodiment and as in illustration of the operation of the present contribution reference is made to the data of the sequence of steps set forth in Table II. This data is received and stored in memory as described above.

Information prestored in the memory includes the coded commands and responses of the transmissions between the PUC 27 an the A/DCU 28. The program in the EPROM provides the instructions for accessing this stored data for use in evaluating the monitored data received from the serial in line 31 and the serial out line 32.

Following the reception of data from the monitored serial in line 31 and serial out line 32 and storage of the data in the memory 38, the analyzer 35 is ready to evaluate the newly received data. The validity of the received data is determined by whether or not the commands and responses are comparable to valid command codes of a Table and to determine whether the received data makes logical sense. The coded characters in the serial in and serial out columns are in hexadecimal numbers.

TABLE I

| Typical Call Sequence | | | | | |
| --- | --- | --- | --- | --- | --- |
| SERIAL IN PUC TO DCU | SERIAL OUT DCU TO PUC | DESCRIPTION | STATE | COMMENTS | TIME |
| 93 |  | TA=1, TB=1 | Idle | All on hook | P0:24:21 |
| 10 |  | K1=Off K2=Off |  |  |  |
| 90 |  | TA=0, TB=0 | Hold Off | Near end originates call; sends off hook to Distant Office | P01:24:22 |
| 07 |  | Requests TA/TB |  |  |  |
|  | 90 | RA=0, RB=0 |  | Far end ack |  |
|  | 07 | TA/TB to follow |  | Check TA/TB status |  |
|  | 10 | TA=0, TB=0 |  |  |  |
| 12 |  | K1=On K2=Off | Loc Off | Battery to CO |  |
|  | 12 | Relay Echo |  | Echo-state change |  |

TABLE I-continued
Typical Call Sequence

| SERIAL IN PUC TO DCU | SERIAL OUT DCU TO PUC | DESCRIPTION | STATE | COMMENTS | TIME |
|---|---|---|---|---|---|
| | 08 | Loop to follow | | Battery to CO ack | |
| | 12 | Loop status | | Closed loop | |
| 13 | | K1=On<br>K2=On | Ian Off | No battery to CO | |
| | 13 | Relay Echo | | | |
| | 08 | Loop to follow | | | |
| | 10 | Loop status | | No battery/loop | |
| | 93 | RA=1, RB=1 | Far end On | Far end signaling/ack | Start MF signaling |
| 10 | | K1=Off<br>K2=Off | Hold Off | Transition state | P01:24:23 |
| | 10 | Relay Echo | | | |
| | 08 | | | | |
| | 12 | Battery status | | | |
| | 08 | | | | |
| | 10 | | | | |
| 12 | | K1=On<br>K2=Off | Loc Off | Ringing is set up | Ringing |
| | 12 | Relay Echo | | | |
| | 90 | RA=0, RB=0 | Far end Off | Far end answers ringing | P01:24:24 |
| | | | | Talk | Talk |
| | 93 | RA=1, RB=1 | Far end On | Far end disconnects | P01:30:15 |
| 93 | | TA=1, TB=1 | Loc On | Near end releases | P01:30:16 |
| 10 | K1=Off | Idle | Both ends idle | P01:30:16 | |
| | K2=Off | | | End of call | |

Table II is similar to Table I but at terminating a call.

TABLE II
Typical Call Sequence

| SERIAL IN PUC TO DCU | SERIAL OUT DCU TO PUC | DESCRIPTION | STATE | COMMENTS | TIME |
|---|---|---|---|---|---|
| 10 | | K1=Off<br>K2=Off | Idle | Both ends on hook; far end starts call process | |
| | 90 | RA=0, RB=0 | Far end Off | Far end goes off hook | P02:51:22 |
| 11 | | K1=Off<br>K2=On | Cont On | Put shunt toward CO near end | |
| | 11 | Relay Echo | | | |
| 90 | | TA=0<br>TB=0 | Cont Off | Near end sends to far end | |
| 13 | | K1=On<br>K2=Off | Tan On | No battery to CO | |
| | 13 | Relay Echo | | | |
| 93 | | TA=1<br>TB=1 | Tan On | To far end Wink | |
| 10 | | K1=Off<br>K2=Off | Idle | Transit On | P02:51:24 |
| | 10 | Relay Echo | | | |
| 11 | | K1=Off<br>K2=On | Cont On | Shunt toward CO | |
| | 11 | Relay Echo | | | |
| 13 | | K1=On<br>K2=On | Tan On | Start signaling (MF) | |
| | 13 | Relay Echo | | | |
| 10 | | K1=Off<br>K2=Off | | Transition | |
| | 10 | Relay Echo | | | |
| 12 | | K1=On<br>K2=Off | Loc On | Ringing | P02:51:25 |
| | 12 | Relay Echo | | | |
| | 08 | | | | |
| | 12 | Battery Status | | | |

TABLE II-continued

Typical Call Sequence

| SERIAL IN PUC TO DCU | SERIAL OUT DCU TO PUC | DESCRIPTION | STATE | COMMENTS | TIME |
|---|---|---|---|---|---|
|  | 08 |  |  |  |  |
|  | 10 |  |  |  |  |
|  | 04 | Loop Status |  | Answer ringing |  |
|  | 12 |  |  |  |  |
| 90 |  | TA=0, TB=0 | Loc Off | Send answer to far end Talk | P02:51:27 |
|  | 93 | RA=1, RB=1 |  | Far end disconnect | P02:55:20 |
| 93 |  | TA=1, TB=1 |  | Near end release | P02:55:21 |
| 10 |  | K1=Off K2=Off | Idle |  |  |
|  | 10 | Relay Echo |  |  |  |
|  | 08 |  |  |  |  |
|  | 10 | No battery |  |  | P02:55:22 |

In Tables I and II the entries in the column headed DESCRIPTION note the condition within the respective channel unit associated with the respective hexadecimal number. The entries in the column headed STATE are standard descriptive telephone technology terms. The time entries show the time of the transmission of the data in hour, minute and second.

To evaluate the data from the serial lines 31 and 32 stored in the memory the CPU 37 performs under the instructions of the program in EPROM 40 an analysis of the succession of transmissions. This program is initiated by turning the analyzer on at the keyboard 44. The general operations performed when carrying out the monitoring of the data transmission and evaluation of the commands and responses are flow charted in FIG. 4. After the apparatus is enabled as represented by oval 45, the data is read in from the serial in line 31 and UART 36A or the serial out line 32 at the UART 36B as represented by block 46. With entry of each coded character a decision is made whether it is data on the serial in line at the diamond 47. The serial in data is stored in memory A represented by block 48 and the serial out data stored in memory B represented by block 49. The next step is retrieving the data in hexadecimal numbers from the memory 38 represented by block 50. The CPU 37 first checks whether the coded character is a valid one in the present embodiment. The checking is accomplished by comparison with a table of the data of the system 25 stored by the program in the memory 38 represented by diamond 51. This is a table of the coded characters that are transmitted between the PUC 27 and the A/DCU 28. Validity of the coded transmitted signal is determined by whether or not the same hexadecimal number is read out from the prestored data in the memory 38.

If the proper response of the coded hexadecimal number is not read out of the prestored memory, in this step of the decision diamond 51 the program branches to a report of failure and the last minute of data transmission prior to the failure is evaluated by printing out the steps of data transmission for the last minute on the printer 39. This is represented by block 52. If the answer is yes the decision at the diamond 51, the process proceeds to the next step of the logic identifying the various conditions and status in the data transmission as exemplified above. These various logic steps are represented by the diamond 53 and are directed to analyzing the data transmitted and stored to detect any errors or abnormal call sequences. Representative areas of this analyzation are set forth above in the examples. As shown in diamond 53 the CPU 37 checks whether the transmitted data contains an error or abnormality. If the data contains an error or abnormality the process branches to a report of failure and the last minute of data transmission prior to the failure is evaluated by printing out on the printer 39 the steps of data transmission for the last minute.

Figure 4:
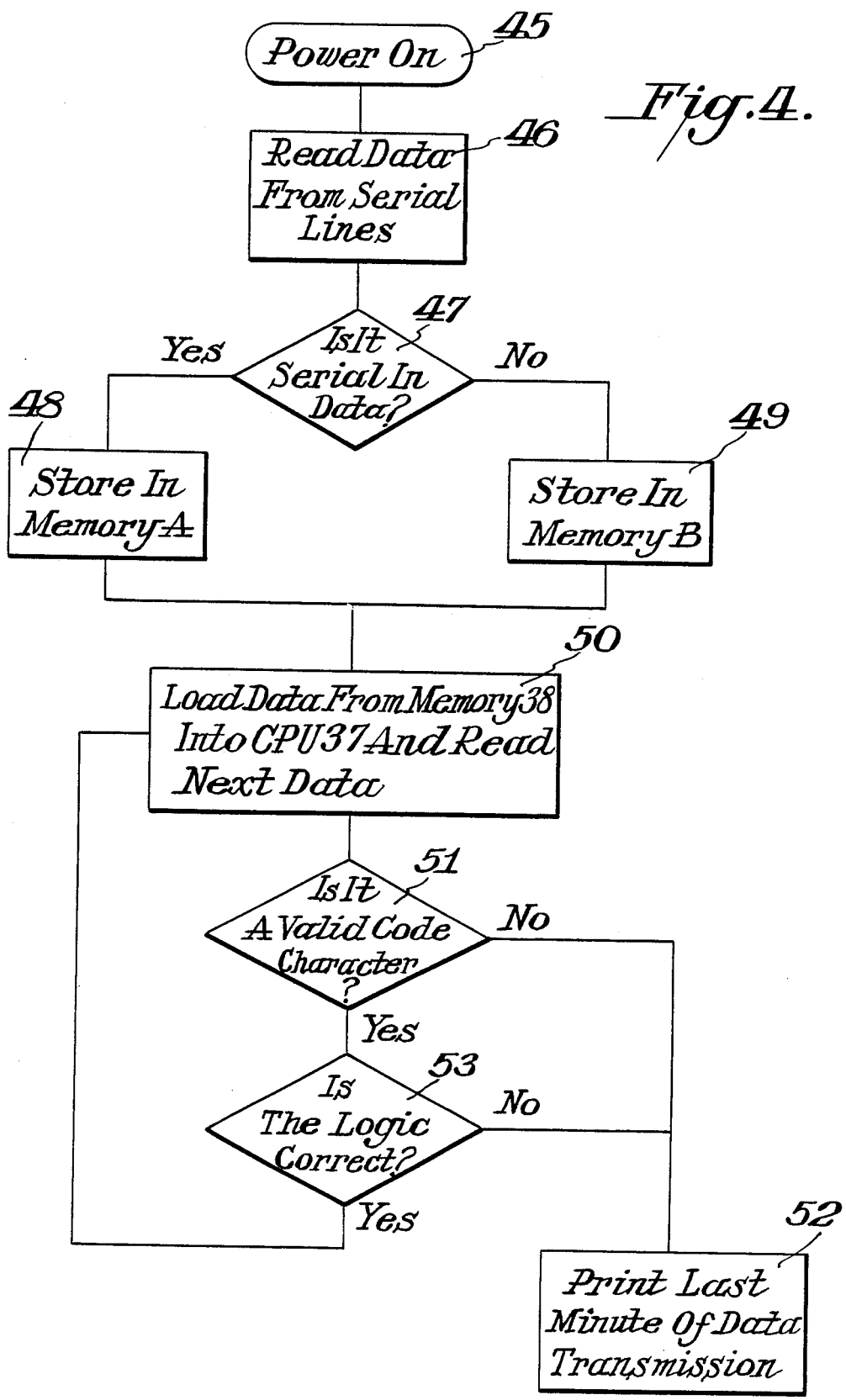
FIG. 4 is a logic flow diagram of the logic to evaluate and identify the conditions and status of the channel units in accordance with the present invention.
Figure 5:
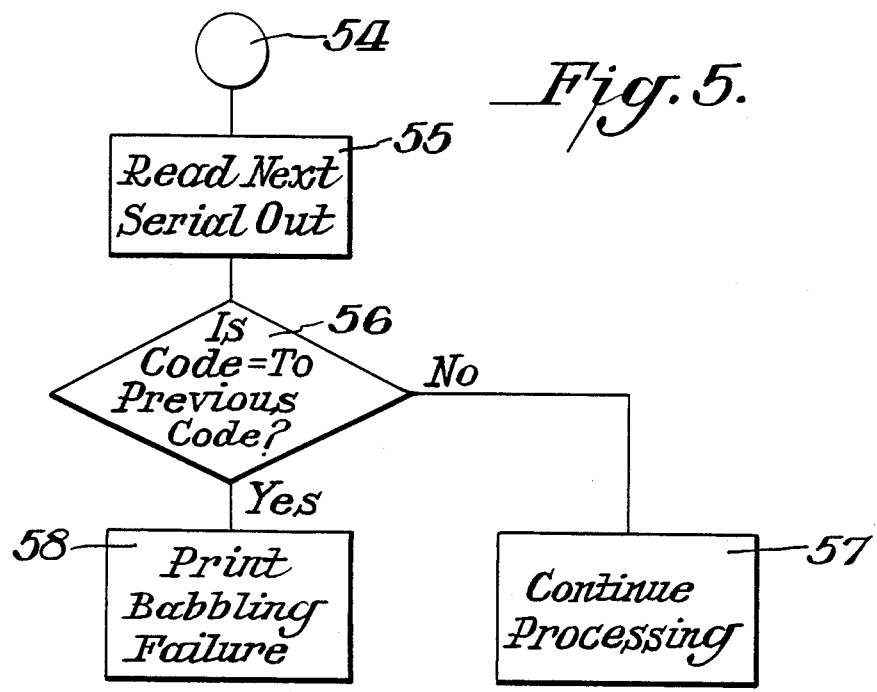
FIGS. 5, 6, and 7 are flow charts of the logic of routines identifying certain conditions or states in data transmission.
Figure 6:
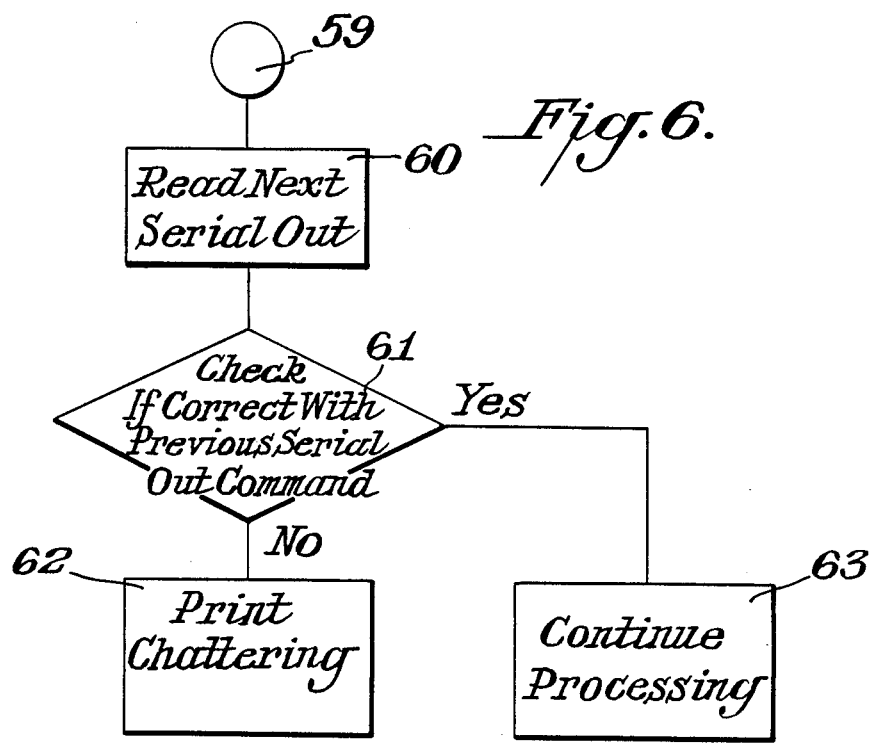
Figure 7:
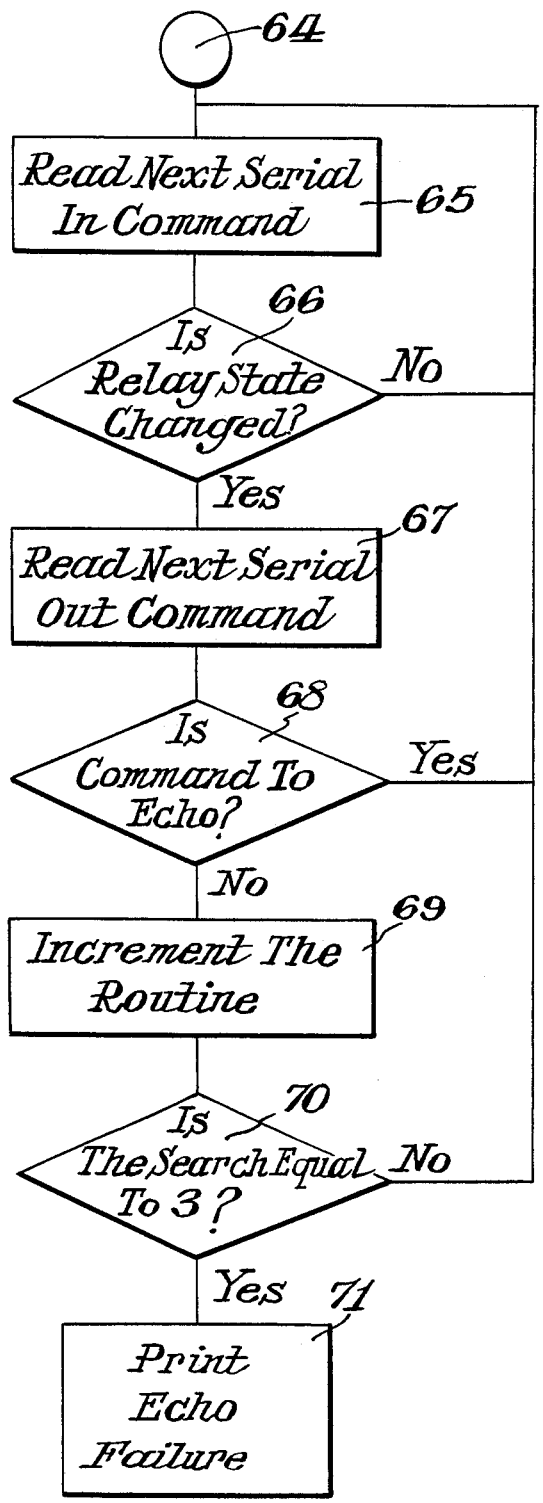

Logic steps represented in decision point 53 of FIG. 4 are charted in greater detail in FIGS. 5, 6, and 7. The connector circles 54, 59 and 64 connect to the affirmative branch of the decision diamond 51. To analyze for babbling as described above in Example C1, the CPU 37 executes in a routine flow charted in FIG. 5. Having received, analyzed and validated a serial out coded character as represented at connection circle 54, the CPU 37 reads the next serial out as shown in block 55.

The CPU 37 checks with the inquiry, is the code character equal to the immediately preceeding serial out character as shown in diamond 56. If the decision is yes a failure is reported and the program branches to a print-out at the printer 39 the last minute of data transmission prior to the failure as shown by block 58. If the decision is no the CPU 37 ends the routine of FIG. 5 by reading the next step in the data transmission as indicated by block 57.

To analyze for chattering as described above in Example C2, the CPU 37 executes a routine flow charted in FIG. 6. Having received, analyzed and validated a serial out coded character as represented at connection circle 59, the CPU 37 reads the next serial out as shown in block 60.

The CPU 37 checks at the diamond 61 with the inquiry, is the code character correct with respect to the immediately preceeding serial out command. If the decision is no a failure is reported and the program branches to a print-out at the printer 39 the last minute of data transmission prior to the failure as shown by block 62. If the decision is yes the CPU 37 ends the routine of FIG. 6 by reading the next step in the data transmission as indicated by block 63.

To analyze for no echo as described above in Example A2, the CPU 37 executes in a routine flow charted in FIG. 7. Having received, analyzed and validated a serial in coded character as represented at connection circle 64, the CPU 37 reads the next serial in as shown in block 65. The CPU 37 first checks to determine whether the relay state is changed as represented by diamond 66. If the decision is no, the CPU 37 proceeds to read the next transmission step.

If the decision is yes the CPU 37 reads the next serial out command stored in the memory 38 as represented by block 67. The CPU 37 then checks with the inquiry, is the command equal to echo the serial in code character as represented by decision diamond 68. If the decision is yes the CPU 37 reads the next serial in command. If the decision is no the CPU 37 increments through the procedure searching for a command equal to echo counting the increments as represented by block 69.

With each increment the inquiry is made, is the number of searches equal to 3. This inquiry is represented by the diamond 70. If the decision is no the routine is looped. If the decision is yes, no command equal to echo having been found after 3 searches a failure is reported and the program branches to a print out of the last minute of data transmission prior to failure as shown by block 71.

The method of the invention employs electronic circiuts with the inclusion of a microprocessor. The CPU 37 executes programmed instructions supplied via the system bus 42 from the system memory in the EPROM 40. The program is loaded into the EPROM 40 with an EPROM burner.

The program that is stored in the EPROM 40 provides the instructions which analyze the data sequences of the data transmissions between the PUC 27 and a unit of the channel units 1-24. The above examples and Tables I and II show analysis of data transmissions and deviations from the normal course of data transmissions which represent errors and abnormalities.

The steps of taking corrective action include initiating a printout of the transmission steps immediately preceding the error or abnormality.

The channels 1-24 may be monitored under a plurality of modes of operation under control from the keyboard 44. All 24 channels may be monitored, analyzed and stored in memory for later print-out and display. Or all 24 channels may be monitored but data gathered for one of the channels printed with complete analyzation being performed on the selected channel. And another mode, after data has been gathered, will display and print selected channel data with complete failure analysis being performed on all the data displayed and printed. Functions of keyboard 44 are used to make changes.

The problem to which the present invention is directed includes the malfunction and possible shut down of the communication between the PUC 27 and the A/DCU 28. This can occur if a failure in a channel unit continues minus detection at the channels unit.

Among other advantages in the present invention are the detection of a malfunction existing in a particular channel and if the bank has been shut down assisting in detecting and identifying the cause of the failure and assisting in returning the unit to service. This can be effected by an operation at the channel unit.

For example, when a failure in a channel occurs the analysis will quickly print it out on the printer and may also display it on the monitor. This will identify what channel failed, what data caused the failure and the selected channel data will be displayed and printed with complete failure analysis. From this the cause of the failure will be established.

It will be understood that on detection of the failure, reception of the data continues.

This invention uses the logic of analysis to result in a printing out of the steps leading up to an error or abnormality. The use of the logic substantially improves the possibility of intercession before the error causes shutdown.

While a preferred embodiment has been described and illustrated, it will be understood that this invention involves a software performance analysis in which analyzing the performance enables identification of an event occurrence and results in a printing of data from which an operator can locate a failure.

The data is collected, analyzed and updated continuously and the operates can locate a single line of code because of the printing of all activity of data transmission within the last minute, before failure. Thus, it is made possible that an operator can quickly locate the problem area before it causes the PUC 27 to shut down. It is noted that in this embodiment the program for operating the analyzer 34 is in the EPROMs 40.

What is claimed:

1. Method of handling the data transmissions of commands and responses as characters between a central control in a telephone communication system and a channel unit to identify and report errors and abnormalities in the data transmission and the channel unit comprising steps of
   providing and storing a first memory with a table of the coded characters of commands and responses suitable for transmission in a data transmission between a central control and a channel unit,
   including the step of transmitting data in commands and responses consisting of characters and transmitted between a central control and a channel unit,
   reading the data transmitted between the central control and a channel unit,
   storing the characters of the transmitted data in a temporary memory,
   obtaining said characters from the temporary memory to determine if the characters of the transmitted data are present in the table of coded characters, and
   if the coded characters are present determine if the transmitted data is the designated data for the coded character
   and printing out the data transmission steps preceding when an incorrect coded character or incorrectly designated data is determined.

2. The method according to claim 1
   wherein said step of determining if the transmitted data is the designated data for the coded character includes
   determining if the coded character is a serial out character and if the serial out character is equal to the immediately preceding serial out coded character and
   when the serial out character is equal to the immediately preceding serial out coded character printing out the data transmission steps immediately preceding.

3. The method according to claim 1
   wherein said step of determining if the transmitted data is the designated data for the coded character includes
   determining if a serial out coded character is incorrectly repeated and when a serial out character is incorrectly repeated printing out the data transmission steps immediately preceding.

4. The method according to claim 1 wherein said step of determining if the transmitted data is the designated data for the coded character includes determining if a relay state has changed and if changed reading out from the first memory the next serial out character to determine if it is equal to the immediately preceding serial in command and if the serial out character is not equal printout of the data transmission steps immediately preceding.

* * * * *